United States Patent
Carmon et al.

(10) Patent No.: US 8,849,336 B2
(45) Date of Patent: Sep. 30, 2014

(54) DYNAMICALLY CONTROLLING A FEMTOCELL BASE STATION DOWNLINK RANGE FOR INTERFERENCE AVOIDANCE

(75) Inventors: Rafy Carmon, Rishon-Le'tzion (IL); Yoav Volloch, Kfar-Saba (IL); Sharon Levy, Hadera (IL); Alon Shechter, Hertzliya (IL)

(73) Assignee: Percello Ltd., Raanana (IL)

( * ) Notice: Subject to any disclaimer, the term of this patent is extended or adjusted under 35 U.S.C. 154(b) by 640 days.

(21) Appl. No.: 13/000,763

(22) PCT Filed: Apr. 22, 2010

(86) PCT No.: PCT/IB2010/051768
§ 371 (c)(1),
(2), (4) Date: Dec. 22, 2010

(87) PCT Pub. No.: WO2010/122512
PCT Pub. Date: Oct. 28, 2010

(65) Prior Publication Data
US 2011/0105110 A1    May 5, 2011

Related U.S. Application Data

(60) Provisional application No. 61/171,474, filed on Apr. 22, 2009.

(51) Int. Cl.
| | | |
|---|---|---|
| H04B 7/00 | (2006.01) | |
| H04W 52/24 | (2009.01) | |
| H04W 52/22 | (2009.01) | |
| H04W 52/14 | (2009.01) | |
| H04W 72/08 | (2009.01) | |
| H04W 52/32 | (2009.01) | |
| H04W 84/04 | (2009.01) | |
| H04W 52/36 | (2009.01) | |
| H04W 52/28 | (2009.01) | |

(52) U.S. Cl.
CPC .......... *H04W 52/223* (2013.01); *H04W 52/244* (2013.01); *H04W 72/085* (2013.01); *H04W 52/325* (2013.01); *H04W 84/045* (2013.01); *H04W 52/367* (2013.01); *Y02B 60/50* (2013.01); *H04W 52/143* (2013.01); *H04W 52/283* (2013.01)
USPC ........ 455/522; 455/435.1; 455/436; 455/443; 455/444; 455/448; 455/449

(58) Field of Classification Search
CPC ............ H04W 52/244; H04W 52/143; H04W 84/045; H04W 52/325; H04W 52/367; H04W 52/283; H04W 72/085
USPC .............. 455/448, 449, 435.1, 436, 443, 444, 455/522
See application file for complete search history.

(56) References Cited

U.S. PATENT DOCUMENTS

| | | | |
|---|---|---|---|
| 8,369,859 B2 * | 2/2013 | Claussen et al. .............. | 455/449 |
| 2009/0042594 A1 | 2/2009 | Yavuz et al. | |
| 2009/0042595 A1 | 2/2009 | Yavuz et al. | |
| 2009/0042596 A1 * | 2/2009 | Yavuz et al. .................. | 455/522 |
| 2009/0280853 A1 * | 11/2009 | Brisebois et al. ............. | 455/522 |
| 2010/0279703 A1 * | 11/2010 | Morita et al. ............. | 455/452.2 |
| 2011/0039596 A1 * | 2/2011 | Maida et al. .................. | 455/522 |

FOREIGN PATENT DOCUMENTS

| | | | |
|---|---|---|---|
| EP | 2 286 623 B1 | | 12/2011 |
| WO | WO2008/093100 | | 8/2008 |

OTHER PUBLICATIONS

International Search Report of the International Searching Authority (ISA/EP) dated Sep. 23, 2010 for the corresponding PCT application No. PCT/IB2010/051768.
Written Opinion of the International Searching Authority (ISA/EP) dated Sep. 23, 2010 for the corresponding PCT application No. PCT/IB2010/051768.
Decision to Grant a European Patent Pursuant to Article 97(1) EPC for European Application No. EP 10726575.3, European Patent Office, Netherlands, mailed on Dec. 1, 2011.

* cited by examiner

*Primary Examiner* — Charles Appiah
*Assistant Examiner* — Jaime Holliday
(74) *Attorney, Agent, or Firm* — Sterne, Kessler, Goldstein & Fox P.L.L.C.

(57) ABSTRACT

A femtocell power control module is operative to: obtain at least one uplink communication characteristic associated with the uplink signals transmitted by the at least one cellular communication device and received by the femtocell base station; estimate, from the obtained uplink communication characteristic, the power level of the downlink signals transmitted by the femtocell base station, as received by the at least one cellular communication device; if the estimated power level of the downlink signals transmitted by the femtocell base station as received by the at least one cellular communication device exceeds a predefined threshold power level, reduce the power level of the downlink signals transmitted by the femtocell base station to a reduced power level.

27 Claims, 7 Drawing Sheets

|  |  | Victim MUE condition and | | | |
| --- | --- | --- | --- | --- | --- |
|  |  | Transient UE (will pass the HNB interference level within short time) | | Static UE (UE remain for long time) | |
|  |  | In idle mode | In active call | In idle mode | In active call |
| HNB status | No camped / DCH HUEs |  |  |  |  |
|  | Camped (idle) but not connected HUEs |  |  |  |  |
|  | There is at least one HUE in active call |  |  |  |  |

DYNAMICALLY CONTROLLING A FEMTOCELL BASE STATION DOWNLINK RANGE FOR INTERFERENCE AVOIDANCE

CROSS REFERENCE TO PRIOR APPLICATIONS

The present application is a National Stage Application of PCT International Application No. PCT/IB2010/051768 (filed on Apr. 22, 2010), under 35 U.S.C. §371, which claims priority to the U.S. Provisional Patent Application No. 61/171,474 (filed on Apr. 22, 2009), which are each hereby incorporated by reference in their respective entireties.

BACKGROUND

1. Technical Field

The field of this invention is related to wireless communication, in particular to improving downlink (DL) coverage while deploying unplanned Femto cells (also known as CSG femtocells).

2. Discussion of Related Art

Femto cells (HNB) are expected to be deployed without radio planning by the end users, using either a dedicated radio channel or using the same radio channel the existing planned network (e.g. MACRO NB) uses.

One of the major concerns of Femto cell deployment is how to guarantee the planned network quality of service while deploying the new HNBs. Following the analysis in 3GPP 25.967 V2.0 and 3GPP 25.820 V820 we focus on HNB interference to MUE reception in the DL. More specifically we will focus our description for the more challenging shared frequency deployment (thought the invention is related to dedicated frequency deployment too).

The interference scenario is the one in which a UE detect a HNB with better signal but is banned from using this HNB and must use existing MNB that has lower signal level. The ban could be due to the used HNB UE access list (e.g. CSG) or due to the HNB limits (e.g. it reached the maximal number of supported UE).

For most MNB connected UEs HNB power will be treated as part of the total noise level (some exception could be UE with interference cancelation). The increase of the noise level could cause coverage holes to the MNB deployed network. It is clear that the severity and the size of those coverage holes (dead zones) depend on the HNB transmitted power, so the main mitigation is to reduce the HNB power.

In the literature there are several approaches to set the HNB Tx power, those approaches may be static in nature (i.e. fixed power), based on MUE measurements relayed to the HNB or its controlling entity via serving MNB or based on the HNB measurement of the existing network during the sniffing period. Several examples to such schemes appears in the following documents, which are incorporated herein by reference in their entirety: U.S. Patent Publication No. 2009/0042594 which discloses adaptation of transmit power based on maximum received signal strength; U.S. Patent Publication No. 2009/0042595 which discloses autonomous adaptation of transmit power; U.S. Patent Publication No. 2009/0042596 which discloses adaptation of transmit power based on channel quality; 3GPP 25.967 V2.0; 3GPP 25.820 V820; and R4-091351, NTT DOCOMO, Enhanced HNB interference coordination based on network control.

Each of those technique suffer from drawbacks, the main drawbacks are:

Fixed power could not adapt to all deployment scenarios

MUE measurement: There is a need to transfer the interference indication to the HNB or to its controlling entity. The information transfer requires modifying the existing network For sniffing based measurement: The path loss between the MNB and HNB could differ from the path loss between the MNB and target MUE. For example the HNB has line of sight to the MNB while the MUE does not

| Abbreviations | |
|---|---|
| CSG | Closed Subscriber Group. Only specific UE may be served by the HNB. |
| DL | Downlink, the RF path from BS to UE |
| HNB | Home NodeB, also known as Femto cell. |
| HUE | UE camping on HNB cell |
| MNB | Macro NodeB. We will use this definition to related to all planed NB, including Micro and Pico cells. |
| MUE | UE camping on Macro cell |
| NB | NodeB |
| OSG | Open Subscriber Group. All UE within network may connect to the HNB. |
| PL | Path Loss |
| QOS | Quality of service. |
| RX, Rx | Receive, Receiver |
| SIB | System Information Block |
| TX, Tx | Transmit, Transmitter |
| UE | User Equipment, also cellular terminal |
| UL | Uplink, the RF path from UE to BS |

Other terminology the one used in 3GPP specification, and are well known.

BRIEF SUMMARY

Embodiments of the present invention provide a femtocell power control module operatively associated with a femtocell base station in a cellular communication network exhibiting the femtocell base station, at least one neighboring macrocell base station, and at least one cellular communication device camped on the at least one neighboring macrocell base station and barred from camping on the femtocell base station, wherein the at least one cellular communication device transmits uplink signals receivable by the femtocell base station and the at least one neighboring macrocell base station, and wherein the femtocell base station and the at least one neighboring macrocell base station transmit downlink signals receivable by the at least one cellular communication device, and wherein all downlink and uplink signals exhibit power levels. The femtocell power control module is operative to: obtain at least one uplink communication characteristic associated with the uplink signals transmitted by the at least one cellular communication device and received by the femtocell base station; estimate, from the obtained uplink communication characteristic, the power level of the downlink signals transmitted by the femtocell base station, as received by the at least one cellular communication device; if the estimated power level of the downlink signals transmitted by the femtocell base station as received by the at least one cellular communication device exceeds a predefined threshold power level, reduce the power level of the downlink signals transmitted by the femtocell base station to a reduced power level.

BRIEF DESCRIPTION OF THE DRAWINGS

The present invention will be more readily understood from the detailed description of embodiments thereof made in conjunction with the accompanying drawings of which.

Drawings and Tables

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways.

Also, it is to be understood that the phraseology and terminology employed herein is for the purpose of description and should not be regarded as limiting.

The invention proposed here allow us to set the transmit power without the need to modify the MNB, MUE or the network behavior by allowing the HNB to dynamically set its power without involving other entities.

The main difference from the existing art includes the detection in and of several scenarios, and based on those scenario dynamically set the HNB power. The HNB power setting refers to both the total HNB power and the common control channels that must be transmit constantly (i.e. for UMTS the total power of CPICH, P-SCH, S-SCH and P-CCPCH (BCH)).

The scenario detection includes:
1. Detect existence of MUE that start to suffer from HNB DL interference by looking at the HNB UL interference level (e.g. total UL RSSI minus HUEs Rx power). A high UL interference level indicates a MUE in the proximity of the HNB, being served by a distant MNB. In addition we may use interference patterns to set dynamically the interference level thresholds:
   Example 1: a burst of 10/20 msec indicate a RACH message transmission, that had been served by MNB so the HNB DL interference to this UE must be low enough to allow it to decode the MNB control channel
   Example 2: interference level increase at low rate and then dramatically decreased indicate the MUE had come closer to the HNB, and then the call had been terminated. There is certain probability that the termination had been due to UE DL demodulation issues (synced-out).
2. Use RACH messages and hard handover of rejected UE to indicate the severity of the HNB generated interference. Some examples are:
   RACH message could include measurement for the HNB and its neighbors. Using those measurements we could calculate the UE SNR and the maximal allowed power that will allow the specific UE to work with the MNB.
   High rejected RACH message rate indicate that the HNB coverage area include many MUE, using the results for several control channels power will allow us to determine acceptable HNB transmission power.
   Rejected RACH messages and hard handovers Rx timing can indicate the distance of the MUE to the HNB and can be used to prevent HNB unexpected cell radius coverage.
3. Use the amount of emergency camped UEs camped on the HNB as an indicator for potential too high DL interference to MUEs.

The power setting includes setting the control channels (that defined the cell coverage area) that we transmit constantly, and the total transmitted power that varies according to instant data transmitted and DL power control. The total interference from the HNB is defined by the instant transmit power.

The power settings according to embodiments of the invention may include:
1. Change control channel power in predefined, periodical or adaptive pattern. Periodical power increase allows us to detect the existence of new HUEs entering the HNB serving area and in the same time to detect MUEs at the edge of the HNB serving area.
   Example 1: following rejected RACH message or rejected handover we may decide to reduce the HNB maximal control power for specific time (Tr=Trecovery time)
   Example 2: In case we detect large number of rejected RACH/handover for control channel power P1, but for lower power P2 (that still allow reasonable HNB service) there were no rejected RACH/HO, we may set the control channel power to P2.
   Example 3: The power level may be based on the number of camped/active HUE, is such a way to grantee their normal operation and QOS, in other words the control power is just good enough for the existing camped HUEs. In this case the cell range will be determined by the farthest HUE.
   Example 4: The power pattern may be based on existence of UE camped on the HNB for emergency calls only.
2. Use the expected UL coverage area, to determine required DL coverage area in terms of path loss, and from it set the control channel power. The goal is to limit the DL coverage area (e.g. by limiting the control channel power) to the approximate UL coverage area.
   UL coverage area could be calculated from the maximal allowed HUE Tx power and the HNB receiver input noise and interference level and/or AGC gain.
   The DL coverage requires assumption on the noise and interference level at the UE input; this value could be based on HUE measurements reports, sniffing results or predefined values.
3. Periodic increase of control channel power, in order to allow new HNB UE to camp on the HNB. In this case we can define $P_{min}$=nominal power of the control channels for a period of $T_{low}$, $P_{max}$=periodical peak power during Thigh following the previous period. Pmax may be also dependent on Tr as set in section 1 above. $P_{min}$, Pmax, Tlow and Thigh are set according to 1 and 2 above.

Figure 1:
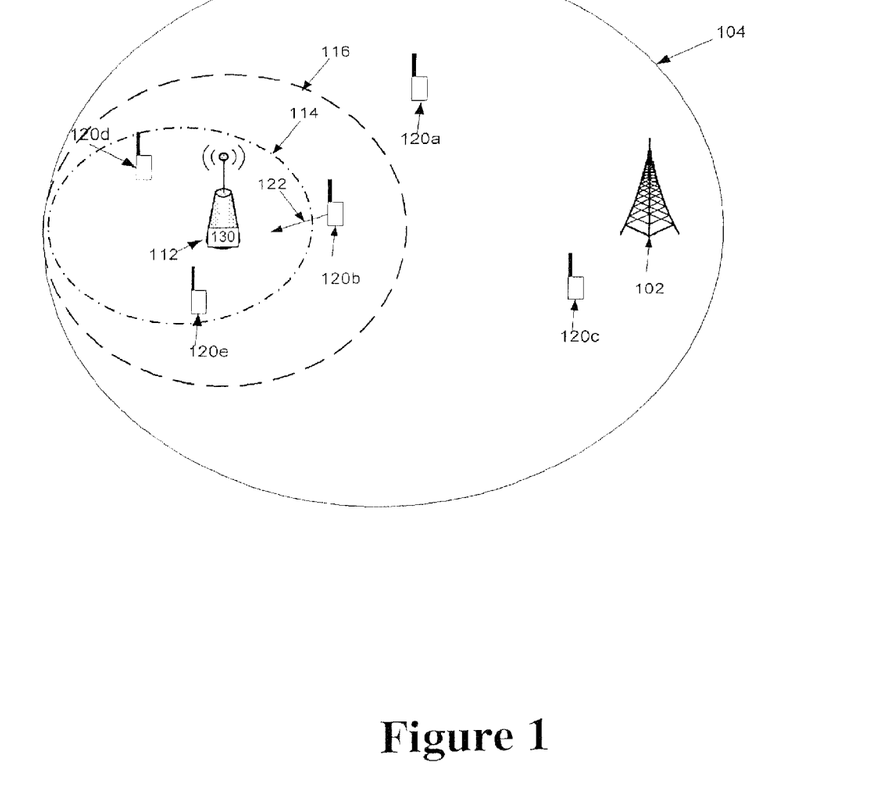
FIG. 1 illustrates a simplified model for HNB deployment effect on MNB coverage area, according to some embodiments of the invention.

FIG. 1 is a high level diagram illustrating the system according to some embodiments of the invention. The invention, in embodiments thereof, deals with reducing the effect of DL interference from newly deployed HNB. A model for the different entities is depicted in MNB (102) transmit power designed to support MUE (120a, 120b, 120c, 120d) inside the area marked by 104.

Each of the MUE may be in different status, for example it may be connected during active dedicated channel (DCH), it may be using low rate data using shared channel in the DL (CELL_FACH), be in idle mode (e.g. waiting for new call), attached to the HNB for emergency calls.

MUE may enter be moving into specific direction, for example MUE 120b is moving in the direction marked by the speed arrow (122).

The HNB (112) transmitted power reduce the coverage area of the MNB (102) according to the instant HNB transmission power. The coverage holes for low and high HNB transmission power are marked by lines 114 and 116. An UEs inside those range may be served by the HNB (like 120e) or will be without valid serving NB (120d).

Figure 2:
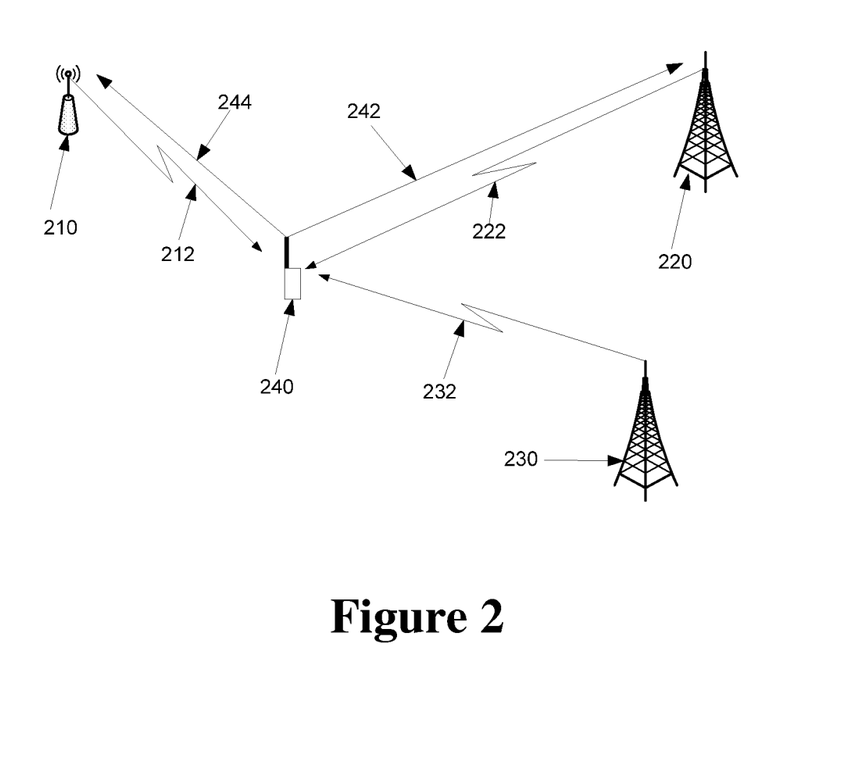
FIG. 2 illustrates a simplified model for a single MUE radio environment, according to some embodiments of the invention.

FIG. 2 presents interference model for single MUE (240) that is connected to MNB (220). In the network other MNB exist (230) that may serve the MUE using soft-handover or may be considered as part of the global interference level. In this example we will consider the second MNB as part of the interferences.

Beside the MNBs additional HNB (210) exist. This HNB contribute to the interference level of the MUE and we assume that the MUE is banned from using it for normal call.

In the following analysis the signal level at the MNB (220) input consist:

MNB (220) wanted signal and interfering signal after the DL attenuation (path loss) 222. We will ignore the same cell interference in the downlink, as the serving cell can limit the interference level (by power setting) and due to the orthogonal transmission between codes.

MNB (230) total power, after the DL path attenuation 232. This signal is part of the MUE interference level.

HNB (210) total power, after the DL path attenuation 212. This signal is part of the MUE interference level too.

The UE may transmit in the uplink. The transmission may be constant (like in voice call) or may be discontinued (like RACH message). The signal transmitted to the serving MNB (220) is proportional to the uplink path loss 242 (for DCH—closed loop power control) or the DL path loss (for RACH—open loop power control). As side effect the HNB also receives the MUE transmitted signal through path loss 244.

As part of the invention we use the fact that the uplink and downlink path loss are approximately equal. The main difference is due to the use of different frequencies in FDD system. Using the measured uplink interference level may give an indication to the HNB that a MUE exist nearby, and therefore it may suffer from HNB interference. Using this information the HNB may reduce it's transmit power according to dynamic or predefined parameters.

Another observation is the fact the cellular communication is limited by the path loss in the UL and in the DL. Using the known maximal allowed transmit power of HUE, the input noise and interference level (that depends in the AGC) we can estimate, optionally per data rate, the uplink range. Based on the uplink max range we could estimate the sufficient DL range and limit the Tx power accordingly.

Figure 4:
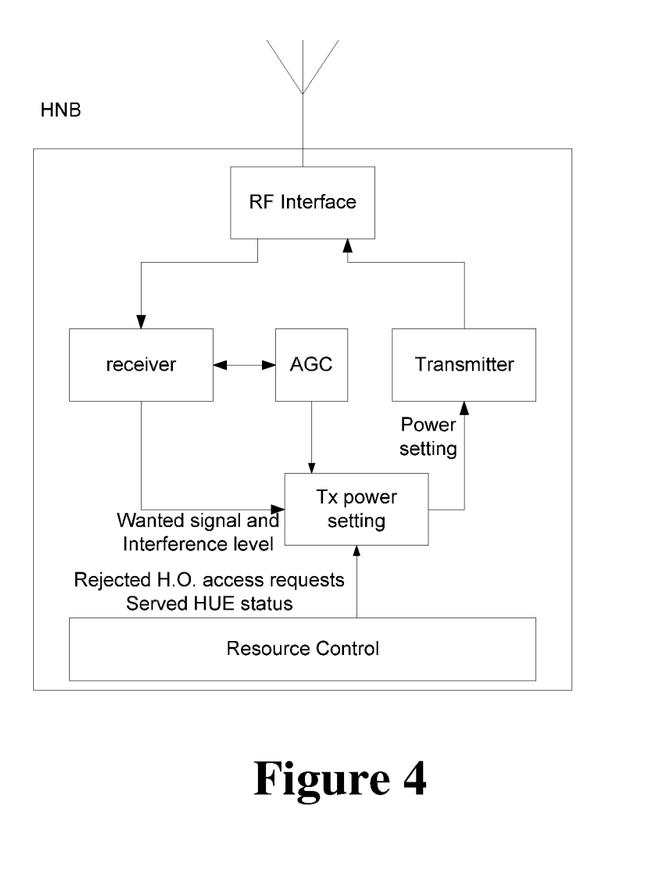
FIG. 4 illustrates the HNB structure according to this invention, according to some embodiments of the invention.
Figure 5:
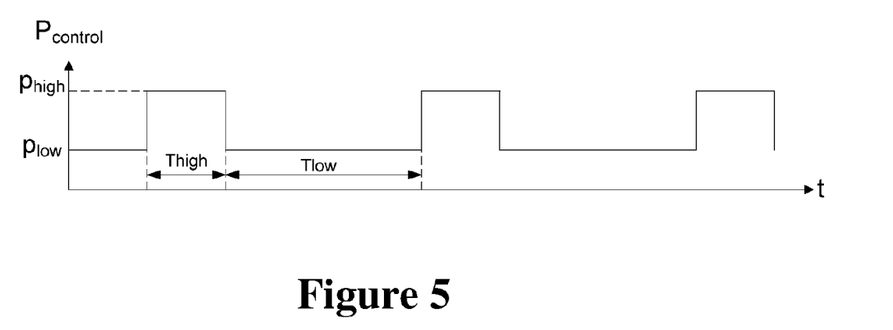
FIG. 5 illustrates an example for HNB tx power variation in time, no rejected UEs., according to some embodiments of the invention.
Figure 6:
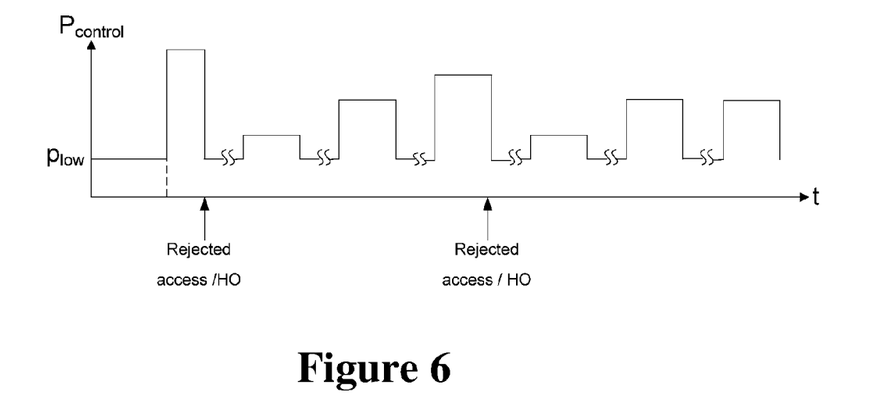
FIG. 6 illustrates an example for HNB tx power variation in time for the case that the HNB had rejected UEs, according to some embodiments of the invention.

The HNB structure according to the current invention. In the description we may skip some of the functionality as they are well known to those skilled in the art of cellular communication.

The HNB may include one or more antennas connected through RF interface to the transmitter and receiver. The connection could be through plurality of options including parallel interface, LVDS interface, DigRF etc.

The receiver is used to detect uplink transmitted data under normal operating mode (for sniffing it may measure other NB downlink signal). To guarantee the input dynamic range the receiver employ an AGC loop that set the gain for the RF part (and possibly some digital gains). The receiver estimates the served HUEs (wanted) power, as well as the interference level and profiles and report them to the "Tx Power Setting" unit. The receiver also measures the distance (delay) for RACH or DCH messages both for HUEs or rejected MUEs.

The resource control update and store the information about the status of the served UEs (HUE), the number of rejected access/HO requests (possibly per transmitted control level), measurements on rejected RACHs and information about MUE emergency camped.

The "Tx Power Setting" uses the following information sources:
  AGC level
  wanted signal levels
  UL interference level and profile
  Number of rejected MUE per power level and at their time intervals
  Distance estimates
  RACH measurements reports
  Number of emergency camped MUEs
to dynamically constantly or periodically set the transmitter target power (maximal and control channel) according to the propose invention. One may remember that for some standards the broadcast information should be updated when the common channel transmit power changes. For example for (3GPP) WCDMA requires that the CPICH power should be transmitted quite accurately in the broadcast channel.

Figure 7:
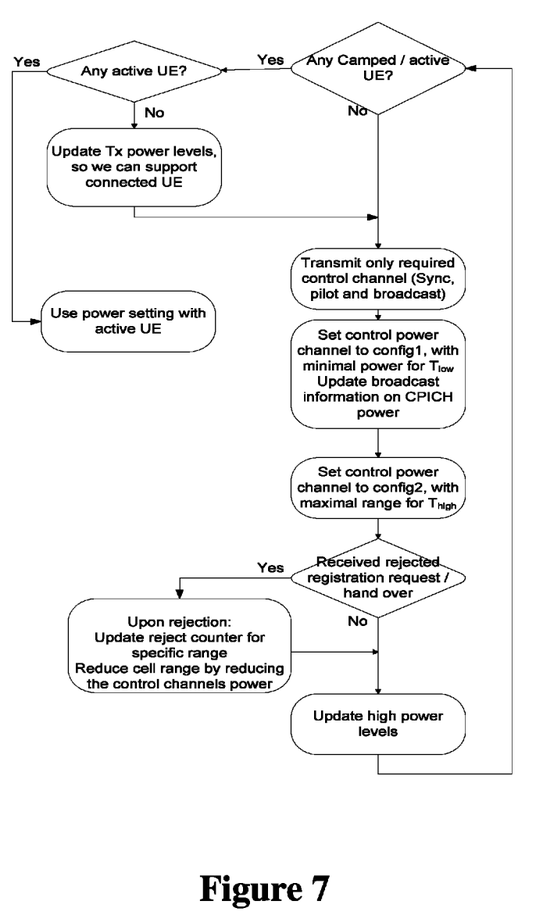
FIG. 7 illustrates a flow chart for setting the HNB control channel power, according to some embodiments of the invention.
Figure 8:
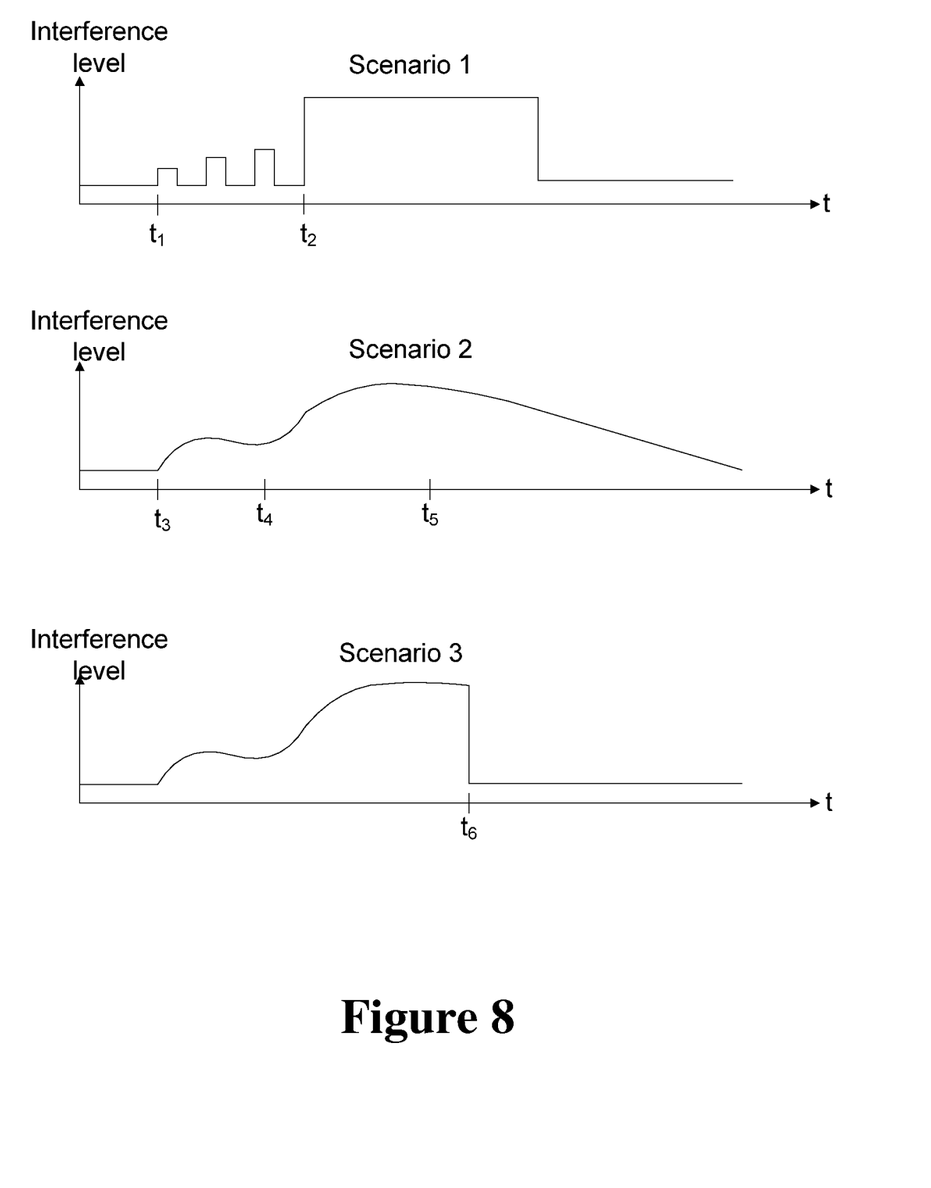
FIG. 8 illustrates examples for the Uplink Interference level variation in time as seen by the HNB receiver, according to some embodiments of the invention.

FIG. 4 and FIG. 7 present one embodiment of the current patent, in particular when no HUE is yet attached to the HNB in a block diagram and flowchart format respectively.

In FIG. 4, low power is assigned to the common control channels most of the time, in specific or periodical intervals we increase the control channel power, and those allowing HUEs to detect the HNB at larger distance and camp on the HNB.

FIG. 7 shows in a flowchart diagram format possible behavior of the control channel power while rejected MUE has been detected. In this figure following the UE rejection the power decrease drastically, then using small increase we slowly change the $P_{high}$ power level for a period of $T_r$, but during $T_r$ another UE is rejected. We can use the power level to update the maximal allowed power ($P_{max}$).

The maximal allowed power $P_{max}$ may be increase slowly over time, using one of plurality of methods for example time-outs timers.

Figure 3:
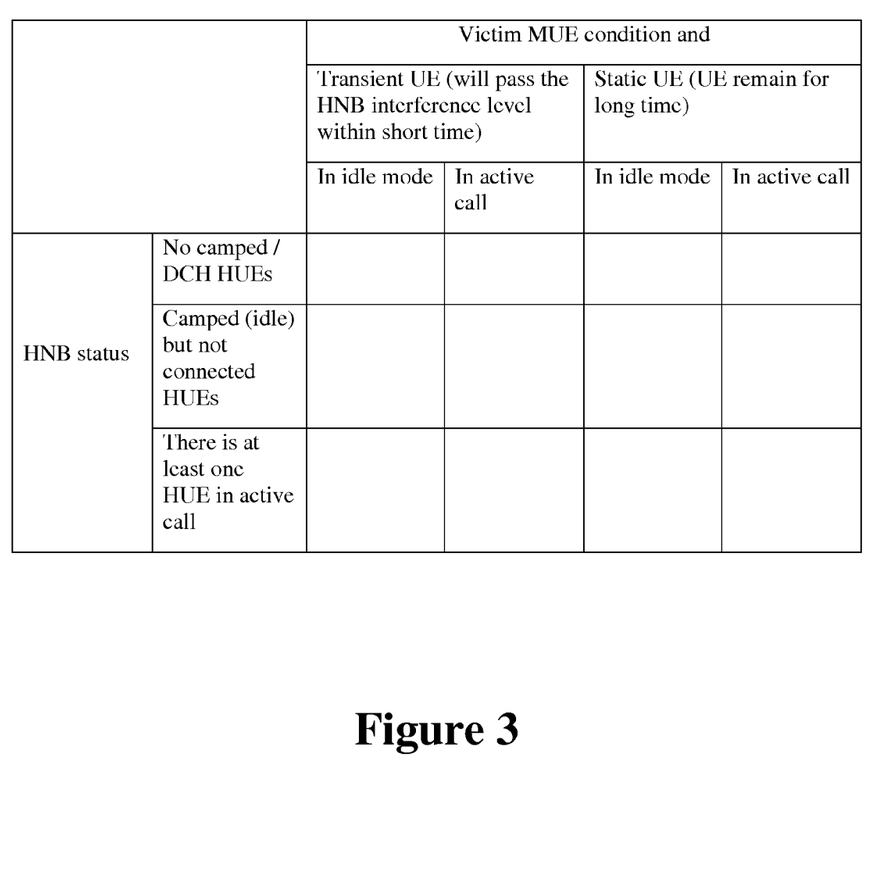
FIG. 3 is a table illustrating an aspect according to some embodiments of the invention.

Back to FIG. 3, it depicts some examples for interference profiles at the HNB input. The HNB may use this information to determine the MUE status:

Scenario A: MUE attached to MNB transmitting RACH preambles ($t_1$) and RACH message ($t_2$). Because the MUE is continually attached to the MNB we know that the HNB DL interference is reasonable for it. We can use the measured interference level to calibrate the expected interference level before HNB power reduction. In addition if RACH preamble had been detected, we can estimate the relative change in UL path loss between the MUE to the MNB and HNB (it will be possible to detect the PRACH because the MNB CPICH power is much larger than the HNB CPICH power and that the UE will select the serving NB according to the power and transmit according to calculated path loss). Knowing the broadcast information of the MNB will improve the estimation, so we may get them from the network at low rate, use information from the MNB downlink as seen by the sniffer, or just use best known practice to guess them.

Scenario B: MUE attached to MNB and is continually transmitting uplink data. The source of the power rise could be due to power control or MNB UE movement. We can use the time scale to decide whether this is power control or movement.

Scenario C: is similar to scenario B, with the different that at time $t_4$ the MNB had ceased to transmit. The reason behind the transmission stop could be call termination or the UE DL SNR is so low that it had lost its sync with the MNB (at this case the UE must stop transmitting)

The aforementioned matrix may serve as a guideline for the power setting.

The HNB behavior could be depended on the existence of HUE and its status (idle/in active call) and the estimated victim MUE status.

The MUE could be in idle mode or active. A victim MUE in idle mode will try to connect to the HNB so we may be aware on its existence, alternatively if it will connect the MNB we may detect its RACH message. The HNB may detect MUE in active call either through the interference level raise in its receiver or by rejected its handover attempt.

We may also detect whether the UE is static or moving and the direction (closer/farther from the HNB). For idle mode we may use the measurement report in the PRACH message (if it tried to attach to our HNB) or the interference profile. For active mode we may use the interference level change.

Now returning to FIG. 1, embodiments of the invention refers to a cellular communication network exhibiting a femtocell base station 112, at least one neighboring macrocell base station 102, and at least one cellular communication device 120 camped on at least one neighboring macrocell base station 102 and barred from camping on femtocell base station 112, wherein at least one cellular communication device 120 transmits uplink signals receivable by femtocell base station 112 and at least one neighboring macrocell base station 102, and wherein femtocell base station 112 and at least one neighboring macrocell base station 102 transmit downlink signals receivable by at least one cellular communication device 120, and wherein all downlink and uplink signals exhibit power levels.

The invention comprises a femtocell power control module 130 operatively associated with femtocell base station 112 that is operative to: obtain at least one uplink communication characteristic associated with the uplink signals transmitted by at least one cellular communication device 120 and received by femtocell base station 112; estimate, from the obtained uplink communication characteristic, the power level of the downlink signals transmitted by femtocell base station 112, as received by at least one cellular communication device 120; if the estimated power level of the downlink signals transmitted by femtocell base station 112 as received by at least one cellular communication device 120 exceeds a predefined threshold power level, reduce the power level of the downlink signals transmitted by femtocell base station 112 to a reduced power level.

Femtocell base station 112 may be further operative to: periodically increase, over a predefined period, the power level of the downlink signals of femtocell base station 112 to a maximal power level and subsequently decrease the power level of the downlink signals of femtocell base station 112 to a minimal power level.

According to some embodiments, if femtocell power control module 130 reduces the power level of the downlink signals transmitted by femtocell base station 112 to a reduced power level, the maximal power level is set to said reduced power level.

According to some embodiments, if femtocell power control module 130 reduces the power level of the downlink signals transmitted by femtocell base station 112 to a predefined reduced power level, femtocell power control module 130 is further operative to gradually increase the power level of the downlink signals transmitted by femtocell base station 112, over time, from the reduced power level to a power level prior to the reduction, wherein the increase is in accordance with a predefined recovery rate.

According to some embodiments, if femtocell power control module 130 reduces the power level of the downlink signals transmitted by femtocell base station 112 to a reduced power level, femtocell power control module 130 is further operative to gradually increase the power level of the downlink signals transmitted by femtocell base station 112, over time, from the reduced power level to the maximal power level, wherein the increase is in accordance with a predefined recovery rate.

The cellular communication network may further exhibit at least one cellular communication device 120d camped on femtocell base station 112. According to some embodiments, the reduced power level may be selected such that the reduced power level is sufficient to retain communication with at least one cellular communication device 120 camped on femtocell base station 112.

According to some embodiments, the reduced power level may be selected such that the reduced power level sufficient to retain communication with at least one cellular communication device 120 camped on femtocell base station 112.

According to some embodiments, the uplink communication characteristic comprise data derived from random access channel (RACH) messages included in the uplink signals transmitted by at least one cellular communication device 120, and wherein said data relate to femtocell base station 112.

According to some embodiments, the uplink communication characteristic comprises Received Total Wideband Power as measured at femtocell base station 112.

According to some embodiments, the cellular communication network further exhibits at least one cellular communication device 120d camped on femtocell base station 112, and the uplink communication characteristic comprises Received Total Wideband Power of the at least one cellular communication barred from camping on femtocell base station 112 and the at least one camped cellular base station, as measured at femtocell base station 112.

Embodiments of the invention comprise femtocell base station 112 comprising: a transceiver; and a femtocell control module 130, wherein femtocell base station 112 is located within a cellular communication network exhibiting femtocell base station 112, at least one neighboring macrocell base station 102, and at least one cellular communication device 120 camped on at least one neighboring macrocell base station 102 and further barred from camping on femtocell base station 112; and wherein at least one cellular communication device 120 transmits uplink signals receivable by femtocell base station 112 and at least one neighboring macrocell base station 102, and wherein femtocell base station 112 and at least one neighboring macrocell base station 102 transmit downlink signals receivable by at least one cellular communication device 120; and wherein all downlink and uplink signals exhibit power levels; and wherein femtocell control module 130 is operative to obtain at least one uplink communication characteristic associated with the uplink signals transmitted by at least one cellular communication device 120 and received by femtocell base station 112; and wherein femtocell control module 130 is further operative to estimate, from the obtained uplink communication characteristic, the power level of the downlink signals transmitted by femtocell base station 112, as received by at least one cellular communication device 120; and wherein if the estimated power level of the downlink signals transmitted by femtocell base station 112 as received by at least one cellular communication device 120 exceeds a predefined threshold power level, femtocell control module 130 is operative to reduce the power level of the downlink signals transmitted by femtocell base station 112 to a reduced power level.

According to some embodiments, femtocell control module 130 is further operative to: periodically increase, over a predefined period, the power level of the downlink signals of femtocell base station 112 to a maximal power level and subsequently decrease the power level of the downlink signals of femtocell base station 112 to a minimal power level; wherein if femtocell control module 130 reduces the power level of the downlink signals transmitted by femtocell base station 112 to a reduced power level, the maximal power level is set to said reduced power level.

According to some embodiments, if femtocell control module 130 reduces the power level of the downlink signals transmitted by femtocell base station 112 to a predefined reduced power level, femtocell power control module 130 is further operative to gradually increase the power level of the downlink signals transmitted by femtocell base station 112, over time, from the reduced power level to a power level prior to the reduction, wherein the increase is in accordance with a predefined recovery rate.

According to some embodiments, if femtocell control module 130 reduces the power level of the downlink signals transmitted by femtocell base station 112 to a reduced power level, femtocell control module 130 is further operative to gradually increase the power level of the downlink signals transmitted by femtocell base station 112, over time, from the reduced power level to the maximal power level, wherein the increase is in accordance with a predefined recovery rate.

The cellular communication network may further exhibit at least one cellular communication device 120d camped on femtocell base station 112. According to some embodiments, the reduced power level is selected such that the reduced power level sufficient to retain communication with at least one cellular communication device 120 camped on femtocell base station 112.

The cellular communication network may further exhibit at least one cellular communication device 120d camped on femtocell base station 112. According to some embodiments, the reduced power level is selected such that the reduced power level is sufficient to retain communication with at least one cellular communication device 120 camped on femtocell base station 112.

According to some embodiments, the uplink communication characteristic comprise data derived from random access channel (RACH) messages included in the uplink signals transmitted by at least one cellular communication device 120, and wherein said data relate to femtocell base station 112.

According to some embodiments, the uplink communication characteristic comprises Received Total Wideband Power as measured at femtocell base station 112.

The cellular communication network may further exhibit at least one cellular communication device 120d camped on femtocell base station 112. According to some embodiments, the uplink communication characteristic comprises Received Total Wideband Power of the at least one cellular communication barred from camping on femtocell base station 112 and the at least one camped cellular base station, as measured at femtocell base station 112.

Embodiments of the invention comprise a method for dynamically adjusting power levels of downlink signals of a femtocell base station, the method comprising: introducing femtocell base station 112 to a cellular communication network exhibiting at least one neighboring macrocell base station 102, and at least one cellular communication device 120 camped on at least one neighboring macrocell base station 102 and barred from camping on femtocell base station 112, wherein at least one cellular communication device 120 transmits uplink signals receivable by femtocell base station 112 and at least one neighboring macrocell base station 102, and wherein femtocell base station 112 and at least one neighboring macrocell base station 102 transmit downlink signals receivable by at least one cellular communication device 120, and wherein all downlink and uplink signals exhibit power levels; obtaining at least one uplink communication characteristic associated with the uplink signals transmitted by at least one cellular communication device 120 and received by femtocell base station 112; estimating, from the obtained uplink communication characteristic, the power level of the downlink signals transmitted by femtocell base station 112, as received by at least one cellular communication device 120; and if the estimated power level of the downlink signals transmitted by femtocell base station 112 as received by at least one cellular communication device 120 exceeds a predefined threshold power level, reducing the power level of the downlink signals transmitted by femtocell base station 112 to a reduced power level.

According to some embodiments, the method further comprises: periodically increasing, over a predefined period, the power level of the downlink signals of femtocell base station 112 to a maximal power level and subsequently decreasing the power level of the downlink signals of femtocell base station 112 to a minimal power level; wherein if the power level of the downlink signals transmitted by femtocell base station 112 is reduced to a reduced power level, setting the maximal power level to said reduced power level.

According to some embodiments, if the power level of the downlink signals transmitted by femtocell base station 112 is reduced to a reduced power level, gradually increasing the power level of the downlink signals transmitted by femtocell base station 112, over time, from the reduced power level to a power level prior to the reduction, wherein the increasing is in accordance with a predefined recovery rate.

According to some embodiments, if the power level of the downlink signals transmitted by femtocell base station 112 is reduced to a reduced power level, gradually increasing the power level of the downlink signals transmitted by femtocell base station 112, over time, from the reduced power level to the maximal power level, wherein the increasing is in accordance with a predefined recovery rate.

According to some embodiments, the cellular communication network further exhibits at least one cellular communication device camped on femtocell base station 112, and wherein the reduced power level is selected such that the reduced power level is sufficient to retain communication with at least one cellular communication device 120 camped on femtocell base station 112.

According to some embodiments, the cellular communication network further exhibits at least one cellular communication device camped on femtocell base station 112, and wherein the reduced power level is selected such that the reduced power level sufficient to retain communication with at least one cellular communication device 120 camped on femtocell base station 112.

According to some embodiments, the uplink communication characteristic comprise data derived from random access channel (RACH) messages included in the uplink signals transmitted by at least one cellular communication device 120, and wherein said data relate to femtocell base station 112.

According to some embodiments, the uplink communication characteristic comprises Received Total Wideband Power as measured at femtocell base station 112.

According to some embodiments, the cellular communication network further exhibits at least one cellular communication device camped on femtocell base station 112, and wherein the uplink communication characteristic comprises Received Total Wideband Power of the at least one cellular communication barred from camping on femtocell base station 112 and the at least one camped cellular base station, as measured at femtocell base station 112.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A femtocell, comprising:
   a transceiver; and
   a power control module configured to:
   obtain at least one uplink communication characteristic associated with uplink signals received by the femtocell,
   estimate, from the obtained at least one uplink communication characteristic, and a number of rejected registration or handover requests, a power level of downlink signals transmitted by the femtocell, and
   reduce the power level of the downlink signals transmitted by the femtocell to a reduced power level if the estimated power level of the downlink signals transmitted by the femtocell exceeds a predefined threshold power level.

2. The femtocell according to claim 1, wherein the femtocell is further configured to:
   periodically increase, over a predefined period, the power level of the downlink signals of the femtocell to a maximal power level and subsequently decrease the power level of the downlink signals of the femtocell to a minimal power level, wherein the maximal power level is set to the reduced power level if the power control module reduces the power level of the downlink signals transmitted by the femtocell to the reduced power level.

3. The femtocell according to claim 2, wherein the power control module is further configured to gradually increase the power level of the downlink signals transmitted by the femtocell from the reduced power level to the maximal power level if the power control module reduces the power level of the downlink signals transmitted by the femtocell to the reduced power level, wherein the increase is in accordance with a predefined recovery rate.

4. The femtocell according to claim 2, wherein at least one cellular communication device is configured to camp on the femtocell, and wherein the reduced power level is selected such that the reduced power level is sufficient to retain communication with the at least one cellular communication device.

5. The femtocell according to claim 1, wherein the power control module is further configured to gradually increase the power level of the downlink signals transmitted by the femtocell from the reduced power level to a power level prior to the reduction if the power control module reduces the power level of the downlink signals transmitted by the femtocell to a predefined reduced power level, wherein the increase is in accordance with a predefined recovery rate.

6. The femtocell according to claim 1, wherein at least one cellular communication device is configured to camp on the femtocell, and wherein the reduced power level is selected such that the reduced power level is sufficient to retain communication with the at least one cellular communication device.

7. The femtocell according to claim 1, wherein the at least one uplink communication characteristic comprises data derived from random access channel (RACH) messages included in the uplink signals, and wherein the data relates to the femtocell.

8. The femtocell according to claim 1, wherein the at least one uplink communication characteristic comprises Received Total Wideband Power as measured at the femtocell.

9. The femtocell according to claim 1, wherein at least one cellular communication device is configured to camp on the femtocell, and wherein the at least one uplink communication characteristic comprises Received Total Wideband Power of at least one cellular communication barred from camping on the femtocell and the at least one camped cellular base station as measured at the femtocell, base station.

10. A femtocell base station, comprising:
    a transceiver; and
    a femtocell control module configured to:
    obtain at least one uplink communication characteristic associated with uplink signals received by the femtocell base station, estimate, from the obtained at least one uplink communication characteristic and a number of rejected registration or handover requests, a power level of downlink signals transmitted by the femtocell base station, and reduce the power level of the downlink signals transmitted by the femtocell base station to a reduced power level if the estimated power level of the downlink signals transmitted by the femtocell base station exceeds a predefined threshold power level.

11. The femtocell base station according to claim 10, wherein the femtocell control module is further configured to: periodically increase, over a predefined period, the power level of the downlink signals of the femtocell base station to a maximal power level and subsequently decrease the power level of the downlink signals of the femtocell base station to a minimal power level, wherein the maximal power level is set to the reduced power level if the femtocell control module reduces the power level of the downlink signals transmitted by the femtocell base station to the reduced power level.

12. The femtocell base station according to claim 11, wherein the femtocell control module is further configured to gradually increase the power level of the downlink signals transmitted by the femtocell base station from the reduced power level to the maximal power level if the femtocell control module reduces the power level of the downlink signals transmitted by the femtocell base station to the reduced power level, wherein the increase is in accordance with a predefined recovery rate.

13. The femtocell base station according to claim 11, wherein at least one cellular communication device is configured to camp on the femtocell base station, and wherein the reduced power level is selected such that the reduced power level is sufficient to retain communication with the at least one cellular communication device.

14. The femtocell base station according to claim 10, wherein the femtocell power control module is further configured to gradually increase the power level of the downlink signals transmitted by the femtocell base station from the reduced power level to a power level prior to the reduction if the femtocell control module reduces the power level of the downlink signals transmitted by the femtocell base station to a predefined reduced power level, wherein the increase is in accordance with a predefined recovery rate.

15. The femtocell base station according to claim 10, wherein at least one cellular communication device is configured to camp on the femtocell base station, and wherein the reduced power level is selected such that the reduced power level is sufficient to retain communication with the at least one cellular communication device.

16. The femtocell base station according to claim 10, wherein the at least one uplink communication characteristic comprises data derived from random access channel (RACH) messages included in the uplink signals, and wherein the data relates to the femtocell base station.

17. The femtocell base station according to claim 10, wherein the at least one uplink communication characteristic comprises Received Total Wideband Power as measured at the femtocell base station.

18. The femtocell base station according to claim 10, wherein at least one cellular communication device is configured to camp on the femtocell base station, and wherein the uplink communication characteristic comprises Received Total Wideband Power of at least one cellular communication barred from camping on the femtocell base station and the at least one camped cellular base station as measured at the femtocell base station.

19. A method for dynamically adjusting a power level of downlink signals of a femtocell base station, comprising:
obtaining at least one uplink communication characteristic associated with uplink signals received by the femtocell base station;
estimating, from the obtained at least one uplink communication characteristic and a number of rejected registration or handover requests, the power level of the downlink signals transmitted by the femtocell base station; and
reducing, using the femtocell base station, the power level of the downlink signals transmitted by the femtocell base station to a reduced power level if the estimated power level of the downlink signals transmitted by the femtocell base station exceeds a predefined threshold power level.

20. The method according to claim 19, further comprising:
periodically increasing, over a predefined period, the power level of the downlink signals of the femtocell base station to a maximal power level and subsequently decreasing the power level of the downlink signals of the femtocell base station to a minimal power level; and
setting the maximal power level to the reduced power level if the power level of the downlink signals transmitted by the femtocell base station is reduced to the reduced power level.

21. The method according to claim 20, further comprising gradually increasing the power level of the downlink signals transmitted by the femtocell base station from the reduced power level to the maximal power level if the power level of the downlink signals transmitted by the femtocell base station is reduced to the reduced power level, wherein the increasing is in accordance with a predefined recovery rate.

22. The method according to claim 20, wherein at least one cellular communication device camps on the femtocell base station, and wherein the reduced power level is selected such that the reduced power level is sufficient to retain communication with the at least one cellular communication device.

23. The method according to claim 19, further comprising gradually increasing the power level of the downlink signals transmitted by the femtocell base station from the reduced power level to a power level prior to the reduction if the power level of the downlink signals transmitted by the femtocell base station is reduced to the reduced power level, wherein the increasing is in accordance with a predefined recovery rate.

24. The method according to claim 19, wherein at least one cellular communication device camps on the femtocell base station, and wherein the reduced power level is selected such that the reduced power level is sufficient to retain communication with the at least one cellular communication device.

25. The method according to claim 19, wherein the at least one uplink communication characteristic comprises data derived from random access channel (RACH) messages included in the uplink signals, and wherein the data relates to the femtocell base station.

26. The method according to claim 19, wherein the at least one uplink communication characteristic comprises Received Total Wideband Power as measured at the femtocell base station.

27. The method according to claim 19, wherein at least one cellular communication device camps on the femtocell base station, and wherein the at least one uplink communication characteristic comprises Received Total Wideband Power of at least one cellular communication barred from camping on the femtocell base station and the at least one camped cellular base station as measured at the femtocell base station.

\* \* \* \* \*

UNITED STATES PATENT AND TRADEMARK OFFICE
CERTIFICATE OF CORRECTION

PATENT NO. : 8,849,336 B2  Page 1 of 1
APPLICATION NO. : 13/000763
DATED : September 30, 2014
INVENTOR(S) : Carmon et al.

It is certified that error appears in the above-identified patent and that said Letters Patent is hereby corrected as shown below:

In the Claims

Column 12, line 61, please replace "femtocell, base station." with --femtocell.--.

Signed and Sealed this
Third Day of March, 2015

Michelle K. Lee
*Deputy Director of the United States Patent and Trademark Office*